No. 697,337. Patented Apr. 8, 1902.
R. E. HAMMER.
COASTER BRAKE FOR VEHICLES.
(Application filed July 22, 1901.)
(No Model.)
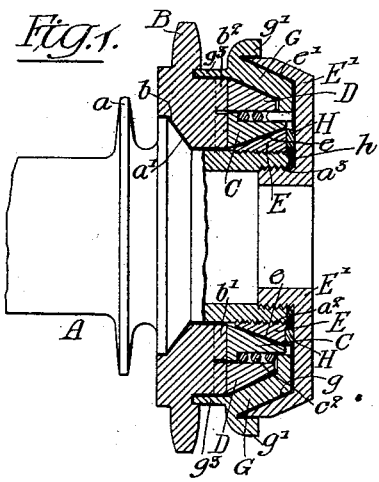
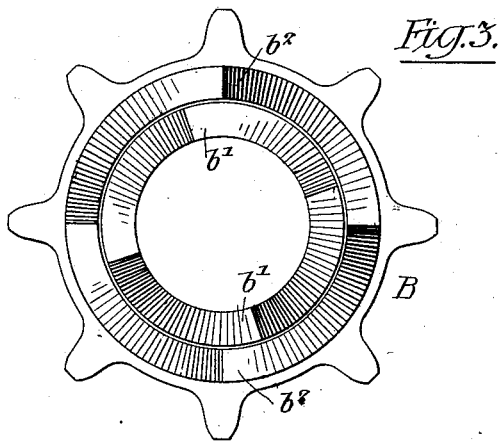
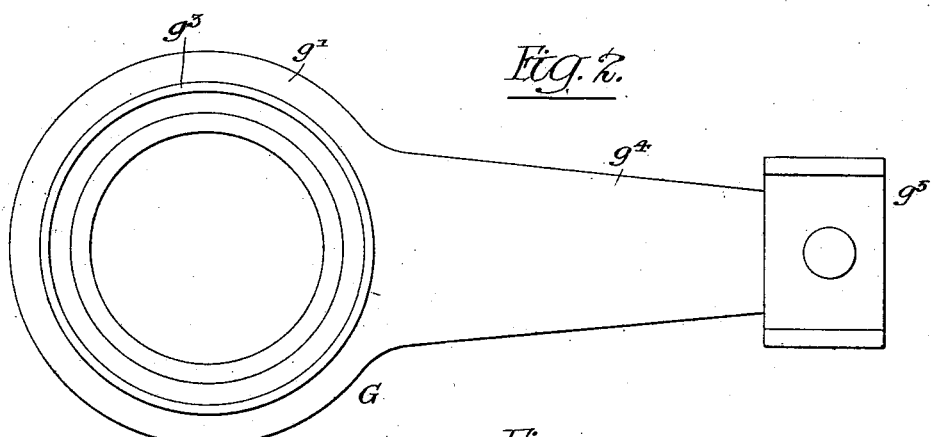
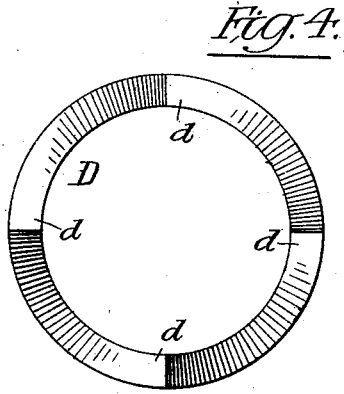
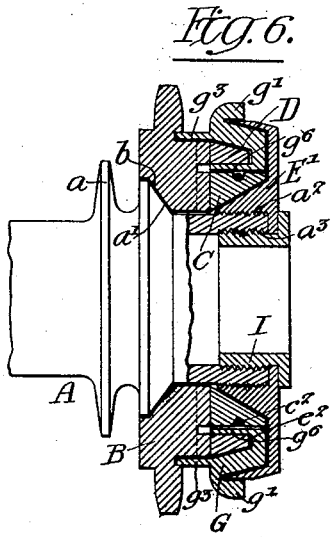
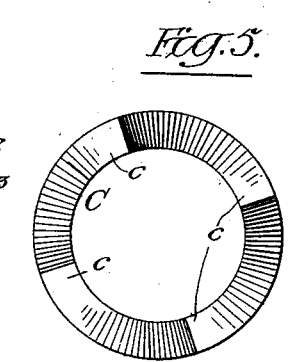
Witnesses:-
Inventor:-
Robert E. Hammer,
by his Attorneys

UNITED STATES PATENT OFFICE.

ROBERT E. HAMMER, OF PHILADELPHIA, PENNSYLVANIA.

COASTER-BRAKE FOR VEHICLES.

SPECIFICATION forming part of Letters Patent No. 697,337, dated April 8, 1902.

Application filed July 22, 1901. Serial No. 69,280. (No model.)

*To all whom it may concern:*

Be it known that I, ROBERT E. HAMMER, a citizen of the United States, residing in Philadelphia, Pennsylvania, have invented certain Improvements in Coaster-Brakes for Vehicles, of which the following is a specification.

My invention relates to certain improvements in mechanism which combines the functions of a clutch between a driving and a driven member and of a brake between the driven member and a relatively fixed member. More particularly, my invention has to do with an improved form of coaster-brake for use on bicycles, tricycles, and similar light vehicles.

The object of my invention is to provide a coaster-brake which, while being reliable in action, shall consist of a minimum number of parts and shall be inexpensive to construct.
This object I attain as hereinafter set forth, reference being had to the accompanying drawings, in which—

Figure 1 is a vertical sectional view of my improved coaster-brake, showing it as applied to a bicycle-hub. Fig. 2 is a plan view of the fixed members of the device. Fig. 3 is a plan view of the sprocket, showing the cam-faces thereon. Figs. 4 and 5 are plan views of the two cam-rings, and Fig. 6 is a vertical sectional view of a modification.

In the above drawings, A is the hub of a bicycle or similar vehicle of the well-known form. There is a flange $a$ for the attachment of metallic spokes, beyond which the hub is diminished in diameter, as shown in Fig. 1, there being an inclined face $a'$ formed adjacent to said flange $a$. The end of the hub has a portion $a^2$, provided with a left-handed thread, and there is a second threaded portion $a^3$ within the hub, also cut with a left-handed thread.

Loosely carried by the hub is a sprocket-wheel B of the common form, a portion $b$ of whose face adjacent to the spoke-flange $a$ is inclined similarly to and normally in contact with the inclined face $a'$ of the hub and whose opposite face is provided with two sets or series of cam-surfaces $b'$ and $b^2$. These preferably project beyond the plane of the sprocket-wheel, and the teeth of each series are inclined in opposite directions.

C and D are rings wedge-shaped in section and each having a face provided with cam-surfaces $c$ and $d$, respectively, similar to the cam-surfaces $b'$ and $b^2$ on the sprocket-wheel. At its point of smallest internal diameter the ring C rests upon the hub A, as shown in Fig. 1, although by far the greater portion of its inclined surface bears against a correspondingly-inclined surface $e$ of an adjustable ring E, held in place by a fixed end piece E', which is provided with a left-handed thread and screwed to the inside of the hub.

There are depressions in the edges of the end of the hub, into which fit correspondingly-shaped teeth $h$ of a washer H, placed between the ring E and the end piece E', as shown.

I preferably place upon the ring C an encircling spring $c^2$, one end of which is fastened to the stationary member of the device. This spring serves a double purpose, allowing the wheel to revolve freely in both directions without applying the brake mechanism hereinafter described and also to slightly retard the revolution of the piece C.

The piece E' is kept in position and made to revolve as part of the hub by means of its left-handed thread, and it is provided with a bearing-surface $e'$, oppositely inclined to the bearing-surface of the ring E.

A piece G has a bearing-surface $g$, correspondingly inclined to the surface $e'$, the outer edge $g'$ of said piece being preferably turned over and made to rest upon the outer edge or face of the end piece E' in order to exclude dust.

The face of the piece G opposite to the face $g$ is depressed, and within it is the ring D, it being noted that there is a flange or projecting edge $g^3$ extending over the points of contact between the cam-surfaces on the ring D and those on the sprocket B, this edge preferably entering a recess in the side of the said sprocket. Forming part of the piece G is an arm $g^4$, to the end of which is secured a U-shaped piece $g^5$, constructed to engage a fixed portion of the vehicle-frame in the manner well known to those skilled in the art.

In applying my improved mechanism, for instance, to a bicycle, A is the hub of the back wheel, and a link chain of any desired form connects the sprocket-wheel B with the gear-wheel on the pedal-shaft.

In operation when the sprocket-wheel is turned so as to move the vehicle in a forward direction the ring C bears lightly upon the surface $e$ of the piece E, and the sprocket at first tends to turn on the hub independently of said ring. The tendency of this latter to lag behind the sprocket-wheel, caused by the slight friction between it and the surface $e$, in turn causes the cam-surfaces $b'$ of the sprocket B to move on the similar surfaces on the ring C, thus moving apart the sprocket B and the ring C and jamming these two pieces between the inclined surfaces $e'$ and $a'$ of the hub and ring E, respectively. As long now as the sprocket-wheel is revolved with a velocity greater than or equal to that of the hub this condition will continue, and the wheel will move with the sprocket. As soon, however, as the speed of the sprocket falls below that of the hub—as, for instance, when the pedals of the bicycle are held from revolving—the sprocket and the ring immediately move together longitudinally, and this action disengaging the ring C and the sprocket B from the faces $e'$ and $a'$ allows the hub to turn independently of the sprocket-wheel. If now the sprocket be revolved in a reverse direction to that previously taken, the ring D, which has hitherto been carried around by the sprocket-wheel, begins to drag upon the inclined surface within the depression in the piece G and immediately attempts to move longitudinally away from the said sprocket-wheel on account of the action between the cam-surfaces and the surfaces $b^2$ on the sprocket-wheel B. This in turn forces the piece G against the inclined surface $e'$ of the end piece E', and the tendency is to jam together the piece G, the cam-ring D, the sprocket B, and the end piece E', together with the surface $a'$. This exerts a retarding action upon the revolution of the hub of a magnitude depending upon the back pressure exerted upon the pedals, and hence on the sprocket.

When it is desired to adjust the relative positions of the parts of my device, the end piece E' is screwed in or out, as desired, thus tightening or loosening the various parts, the washer H preventing said piece from being moved by any revolution of the ring E.

In the modification shown in Fig. 6 the ring E is made integral with the end piece E', and there is a projecting section $g^6$ of the stationary piece G extending between the cam-rings C and D, the said ring D operating in the recess $e^2$ thus formed. The end piece E is then provided with an internal left-handed thread and screwed on the hub. It is held in place by a flanged jam-nut I, provided with a right-handed thread and screwed into the correspondingly-threaded interior of the hub.

Any adjustment of the parts of my improved coaster-brake which may be necessary on account of wear is easily accomplished by slacking off the jam-nut I and turning the piece E until the various parts of the device occupy the proper relative positions.

It will be seen that my improved brake is quick and positive in action and in view of the fewness of its parts can be made very strong and compact and that at a comparatively small expense. A further advantage of its simplicity is the small possibility of breakage of any of the working parts, and in addition it has been found to be easy of adjustment and reliable in action. In addition to this it is to be noted that a wheel equipped with my improved device may be turned in either direction, the brake mechanism not being applied unless the pedals are turned backward.

I claim as my invention—

1. The combination in a combined brake and clutch, of a driving member having oppositely-pitched cam-surfaces, and a bearing-surface, a driven member having bearing-surfaces of which one is placed to coöperate with the bearing-surface of the driving member, a stationary member, a piece having a cam-surface directly operative upon one of the surfaces of the driving member and a second piece also having a cam-surface, the same being operative directly upon the second cam-surface of the driving member and on the same side thereof as the first piece, substantially as described.

2. The combination of a driving member having oppositely-pitched cam-surfaces and a bearing-surface, a driven member, two bearing-surfaces of which one is placed to coöperate with the bearing-surface of the driving member, a fixed member and two rings having cam-surfaces placed to act directly upon the cam-surfaces of the driving member, one of said rings acting between the driving member and the driven member, the second ring being placed on the same side of said driving member as the first ring and acting between the driving member and the stationary member, substantially as described.

3. The combination of a driving member having oppositely-pitched cam-surfaces at right angles to its axis and a bearing-surface, a driven member having two bearing-surfaces of which one is placed to coöperate with the bearing-surface of the driving member, a stationary member and two rings each provided with a cam-surface, substantially as described.

4. The combination of a sprocket-wheel having at one side a bearing-surface, a wheel-hub provided with bearing-surfaces of which one coöperates with the bearing-surface of the sprocket-wheel, a relatively stationary member, a series of oppositely-pitched cam-surfaces upon the sprocket-wheel at right angles to the axis thereof, a ring having cam-surfaces constructed to act in connection with one series of cam-surfaces upon the sprocket-wheel whereby said wheel is moved longitudinally and is operatively coupled with the hub, said ring also bearing upon a second bearing-surface of the hub when the sprocket-wheel revolves at a higher rate of speed than that of said hub, together with a second ring also having cam-surfaces placed to coact with the second series of cam-surfaces on the sprocket-wheel to retard the motion of the hub when said sprocket-wheel is turned backward, substantially as described.

5. The combination of a sprocket-wheel having upon it two oppositely-pitched series of cam-surfaces, two rings of a wedge-shaped section, each having cam-surfaces upon one edge and constructed to engage the cam-surfaces upon the sprocket-wheel, the hub having two inclined surfaces upon it, one placed to be engaged by one of the rings and the other placed to be engaged by the sprocket-wheel, and a relatively stationary piece also having an inclined surface placed to be engaged by the second ring, substantially as described.

6. The combination of a sprocket-wheel having two series of oppositely-pitched cam-surfaces and a bearing-surface, two rings of a wedge-shaped section provided with cam-surfaces pitched to correspond with the cam-surfaces of said wheel, a hub provided with two oppositely-inclined bearing-surfaces, and a relatively stationary piece, substantially as described.

7. The combination of a sprocket-wheel having upon it two oppositely-pitched series of cam-surfaces, two concentric rings each having a cam-surface placed to coöperate with a surface of the sprocket-wheel, a hub provided with an inclined bearing-surface, an adjustable piece fixed thereto, a relatively stationary piece, the inner one of said rings acting to couple the hub to its sprocket, when said sprocket is revolved at a rate of speed higher than that of the hub, and the outer ring acting to force the stationary piece against the piece fixed to the hub when the sprocket is turned backward, substantially as described.

In testimony whereof I have signed my name to this specification in the presence of two subscribing witnesses.

ROBERT E. HAMMER.

Witnesses:
  WILLIAM E. BRADLEY,
  JOS. H. KLEIN.